US009428086B2

(12) United States Patent
Aktas

(10) Patent No.: US 9,428,086 B2
(45) Date of Patent: *Aug. 30, 2016

(54) OVER-TRAVEL MECHANISM FOR EASY-ENTRY SYSTEM

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,769

(22) Filed: Dec. 10, 2015

(65) Prior Publication Data

US 2016/0090012 A1  Mar. 31, 2016

Related U.S. Application Data

(63) Continuation of application No. 14/332,908, filed on Jul. 16, 2014, now Pat. No. 9,254,761.

(51) Int. Cl.
| | |
|---|---|
| *B60N 2/02* | (2006.01) |
| *B60N 2/48* | (2006.01) |
| *B60N 2/36* | (2006.01) |
| *B60N 2/12* | (2006.01) |
| *B60N 2/20* | (2006.01) |
| *B60N 2/22* | (2006.01) |
| *B60N 2/30* | (2006.01) |

(52) U.S. Cl.
CPC ............ *B60N 2/366* (2013.01); *B60N 2/12* (2013.01); *B60N 2/20* (2013.01); *B60N 2/22* (2013.01); *B60N 2/309* (2013.01); *B60N 2/3013* (2013.01)

(58) Field of Classification Search
CPC .......... B60N 2/20; B60N 2/309; B60N 2/12; B60N 2/22; B60N 2/3013; B60N 2002/0208; B60N 2/39
USPC ........... 297/378.12, 313, 340, 344.15, 344.1, 297/371, 378, 378.1
See application file for complete search history.

(56) References Cited

U.S. PATENT DOCUMENTS

| | | | | |
|---|---|---|---|---|
| 3,038,217 | A * | 6/1962 | Harris | F25D 23/087 |
| | | | | 156/145 |
| 4,634,180 | A * | 1/1987 | Zaveri | B60N 2/123 |
| | | | | 248/430 |
| 4,648,657 | A | 3/1987 | Cox et al. | |
| 4,671,571 | A | 6/1987 | Gionet | |
| 5,020,853 | A | 6/1991 | Babbs | |
| 5,154,476 | A * | 10/1992 | Haider | B60N 2/2352 |
| | | | | 297/367 R |
| 5,393,116 | A * | 2/1995 | Bolsworth | B60N 2/01583 |
| | | | | 296/65.03 |

(Continued)

*Primary Examiner* — Chi Q Nguyen
(74) *Attorney, Agent, or Firm* — Vichit Chea; Price Heneveld LLP

(57) ABSTRACT

A seat assembly includes an easy-entry system with a seat frame having a seatback pivotally coupled to a seat member. An external lever is operably coupled to an engagement lever disposed on the seat frame and is configured to activate the engagement lever to move the seatback into an engaged position with a sector pivotally coupled to the seat frame. A disengagement rod flexibly is coupled to a spring member disposed on the sector at a first end and further coupled to a track release lever at a second end. As such, rotation of the seatback to a release position rotates the track release lever to unlock the seat assembly from a seat track. Further rotation of the seatback from the release position to an over-travel position loads the spring member but does not further rotate the track release lever.

19 Claims, 8 Drawing Sheets

(56) References Cited

U.S. PATENT DOCUMENTS

| | | | |
|---|---|---|---|
| 6,328,381 B1 * | 12/2001 | Smuk | B60N 2/20 297/365 |
| 6,739,668 B2 * | 5/2004 | Coman | B60N 2/206 297/378.12 |
| 6,827,404 B2 * | 12/2004 | Blair | B60N 2/06 297/344.11 |
| 7,152,922 B2 * | 12/2006 | Garland | B60N 2/01583 296/65.01 |
| 7,195,303 B2 | 3/2007 | Nihonmatsu et al. | |
| 7,198,316 B2 * | 4/2007 | Lutzka | B60N 2/01583 296/65.03 |
| 7,523,913 B2 | 4/2009 | Mizuno et al. | |
| 8,141,954 B2 * | 3/2012 | Kumazaki | B60N 2/3065 297/341 |
| 8,517,328 B2 | 8/2013 | Wieclawski et al. | |
| 8,585,145 B2 | 11/2013 | Nock et al. | |
| 8,657,377 B2 | 2/2014 | Barzen et al. | |
| 8,690,251 B2 | 4/2014 | Miller et al. | |
| 9,254,761 B1 * | 2/2016 | Aktas | B60N 2/20 297/378.12 |
| 2003/0080598 A1 * | 5/2003 | Becker | B60N 2/0705 297/341 |
| 2003/0122412 A1 * | 7/2003 | Niimi | B60N 2/0705 297/341 |
| 2008/0007104 A1 * | 1/2008 | Yokota | B60N 2/1615 297/344.15 |
| 2013/0057041 A1 | 3/2013 | Ngiau et al. | |
| 2013/0278033 A1 | 10/2013 | Tame et al. | |

\* cited by examiner

OVER-TRAVEL MECHANISM FOR EASY-ENTRY SYSTEM

CROSS-REFERENCE TO RELATED APPLICATION

The present application is a continuation of U.S. patent application Ser. No. 14/332,908 filed Jul. 16, 2014, now U.S. Pat. No. 9,254,761, entitled OVER-TRAVEL MECHANISM FOR EASY-ENTRY SYSTEM, the entire disclosure of which is hereby incorporated herein by reference.

FIELD OF THE INVENTION

The present invention generally relates to a seat assembly having an easy-entry system, and more particularly, to a seat assembly having an over-travel mechanism for use in conjunction with the easy-entry system.

BACKGROUND OF THE INVENTION

In vehicles having a third row seating option, it is generally necessary to move one of the left or right rear seats to a forward leaning easy-entry position to allow greater access to the third row seating located behind the rear seat assemblies. In order to move a rear seat assembly to an easy-entry position, the seatback will generally be pivoted forward relative to a seat portion of the seat assembly, and the seat assembly will move forward along a track system. Generally, as the seatback is pivoted forward, a latch mechanism will unlock from the track system to allow the seat assembly to move forward along the seat track. A seat track lock release stroke generally requires a finite displacement in order to trigger the latch mechanism to unlock from the seat track. If the minimum stroke to unlock the latch mechanism is not achieved during an easy-entry function, then the seat track may be subject to a ratcheting noise resulting from the latch mechanism being partially engaged with the seat track. Further, if the minimum stroke is not achieved, the latch mechanism may be fully locked with the seat track, thereby resulting in the seat assembly being locked in position on the seat track. Thus, an over-travel mechanism is desired to ensure that the track mechanism is fully and consistently released from the seat track during an easy-entry function.

SUMMARY OF THE INVENTION

One aspect of the present invention includes a seat assembly with a seatback pivotally coupled to a seat member. The seatback is rotatable between use, release and over-travel positions relative to the seat member. A sector and a track release lever pivotally are coupled to the seat member and are configured to rotate with the seatback between the use, release and over-travel positions. A disengagement rod is flexibly coupled to the sector and the track release lever, such that rotation of the seatback to the release and over-travel positions causes the track release lever to unlock the seat assembly from a seat track.

Another aspect of the present invention includes a seat assembly having an easy-entry system. The easy-entry system includes a seat frame having a seatback pivotally coupled to a seat member. An external lever is operably coupled to an engagement lever disposed on the seat frame and is configured to activate the engagement lever to move the seatback into an engaged position with a sector pivotally coupled to the seat frame. A disengagement rod flexibly is coupled to a spring member disposed on the sector at a first end and further coupled to a track release lever at a second end. As such, rotation of the seatback to a release position rotates the track release lever to unlock the seat assembly from a seat track. Further rotation of the seatback from the release position to an over-travel position loads the spring member but does not further rotate the track release lever.

Yet another aspect of the present invention includes a seat assembly having a seat frame including a pivoting seatback and a seat member. A disengagement rod and a spring member are coupled between a sector and a track release lever, such that pivoting the seatback to a release position rotates the sector and the track release lever to unlock the seat assembly from a seat track. The seatback of the seat assembly is further moveable to an over-travel position wherein the spring member loads as the sector rotates.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
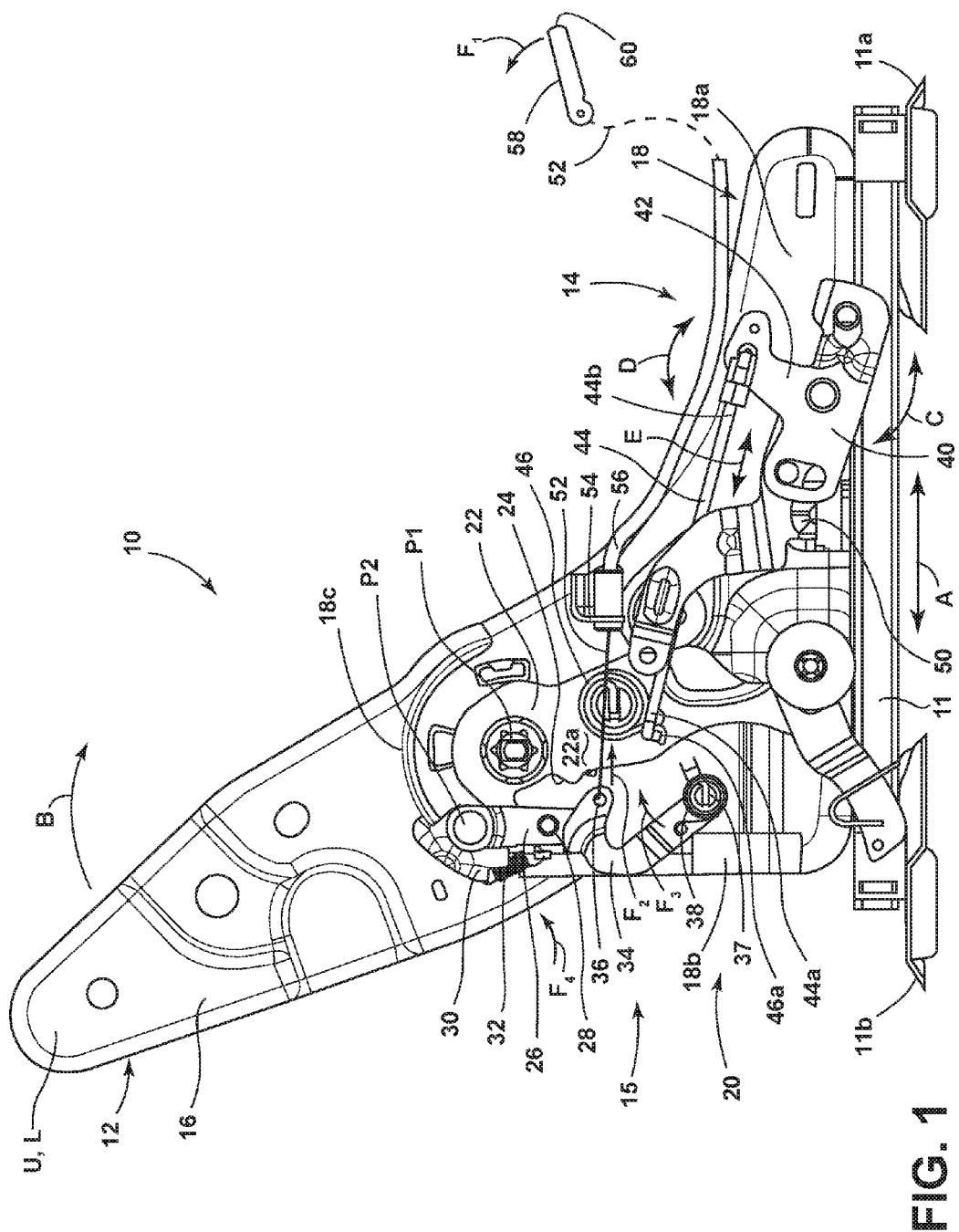
FIG. 1 is a side elevational view of a seat assembly in an upright locked use position, wherein the seat assembly includes an easy-entry system and over-travel mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
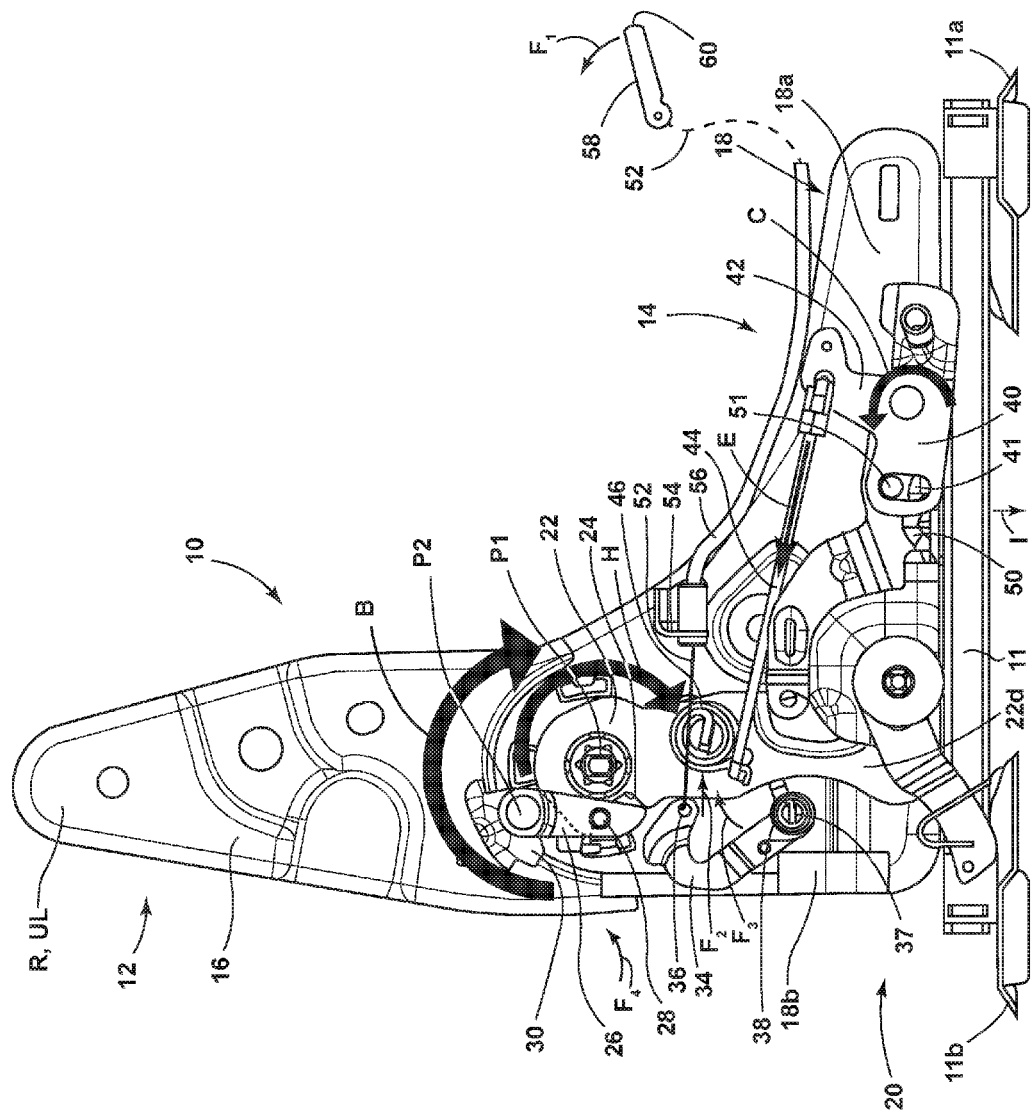
FIG. 5 is a side elevational view of the seat assembly of FIG. 4 showing relative movement of the seatback towards a forward leaning position and relative movement of a sector plate engaged with a crank pin, further showing relative movement of a latch mechanism being moved to an unlatched position.
Figure 6:
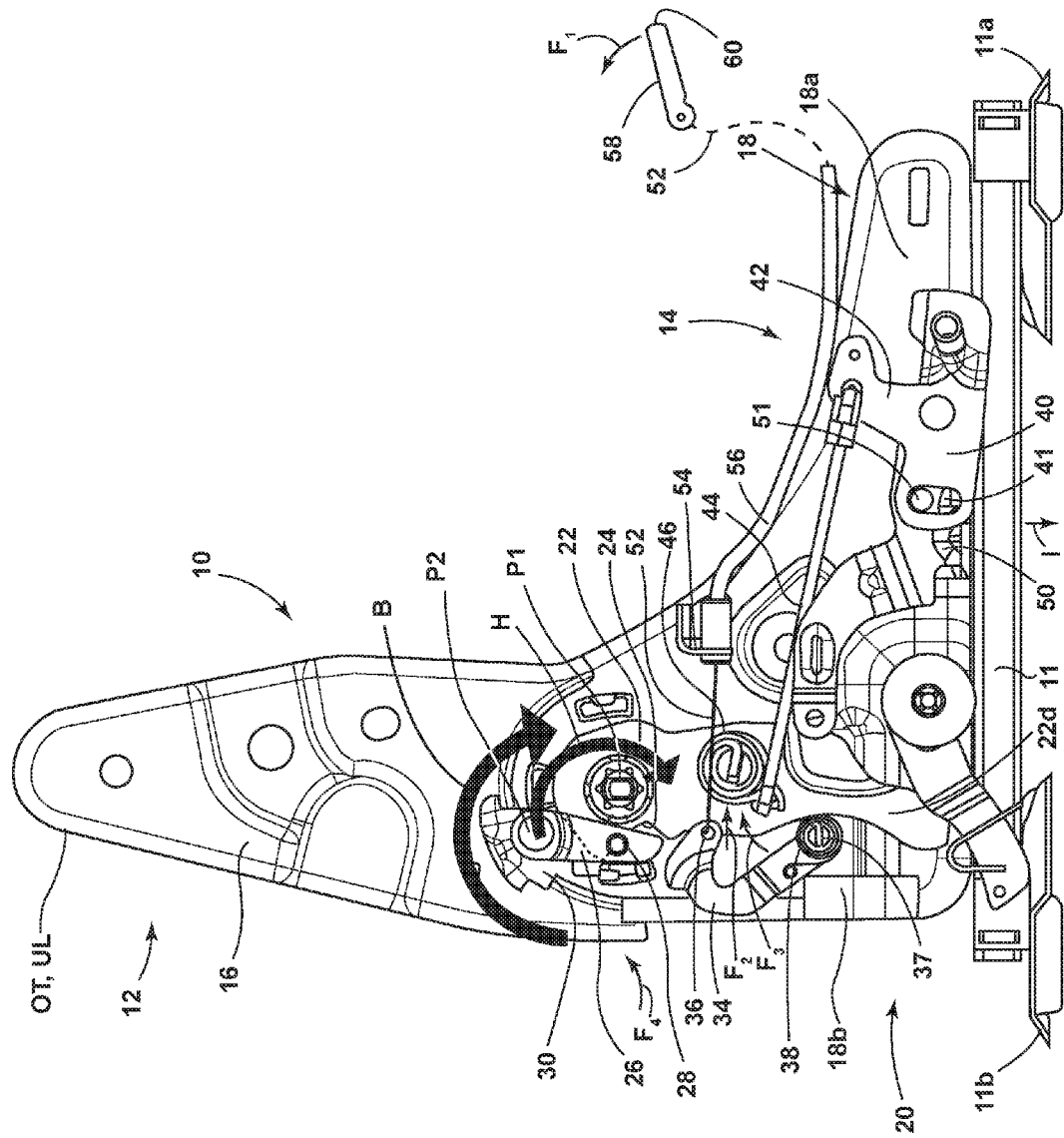
FIG. 6 is a side elevational view of the seat assembly of FIG. 5 showing the seatback and sector plate in a final over-travel position.

As used herein, the terms "easy-entry function" and "easy-entry system" refer to the ability of a seat assembly to move from an upright or partially reclined use position, as shown in FIG. 1, to an upright or forward leaning easy-entry position, as shown in FIGS. 5 and 6. The easy-entry system is the mechanism by which the easy-entry function is executed for providing increased access to an area disposed behind the seat assembly. The easy-entry function is most commonly used with a rear seat assembly for providing access to a third row seating option in a vehicle.

FIGS. 1-7B generally depict a seat assembly having an easy-entry system disposed on a right side of the seat assembly. Thus, the seat assembly depicted in FIGS. 1-7B would generally be positioned behind a passenger seat in a vehicle as a rear seat assembly. A left hand side rear seat assembly will generally have an easy-entry system disposed on the left side of the seat assembly in a similar, but mirrored configuration relative to the seat assembly depicted in FIGS. 1-7B. In this way, the left and right rear seats of the present invention include easy-entry systems which are readily accessible in an external position on the rear seats when the rear doors of the vehicle are opened. Thus, the seat assembly of the present invention is configured to have dual parallel seat tracks that are latched and unlatched using the easy-entry system on both left and right sides of the seat assembly.

Referring now to FIG. 1, the reference numeral 10 generally designates a seat assembly for use in a vehicle interior. The seat assembly 10 includes a seatback 12 which is pivotally coupled to a seat member 14 to define a seat frame 15. The seat member 14 is contemplated to be slidably coupled to a vehicle floor along a seat track assembly 11 at mounts 11a, 11b. In this way, the seat assembly 10 is moveable along the vehicle floor in forward and rearward directions along the path as indicated by arrow A. The seat assembly 10 is shown in FIG. 1 as having side members 16, 18 which generally define the seatback 12 and the seat member 14 respectively. The seat assembly 10 of FIG. 1 is shown having a seat cover and cushions removed to reveal side members 16, 18 as well as the easy-entry system 20 of the present invention. It is contemplated that the seat assembly 10, in assembly, would include parallel side members relative to side members 16, 18 having any number of cross members disposed therebetween for providing structure to the seat assembly 10 for supporting a vehicle occupant.

As further shown in FIG. 1, the easy-entry system 20 includes a number of components disposed on first and second portions 18a, 18b of side member 18. First portion 18a of side member 18 is generally a horizontal portion, while second portion 18b is generally an upright portion which is pivotally coupled to side member 16 of the seatback 12 at pivot point P1. The easy-entry system 20 allows for the seatback 12 to rotate forward along a path as indicated by arrow B to a forward leaning over-travel position as shown in FIG. 6. As shown in FIG. 1, the seatback 12 is in a locked position L which is a partially reclined use position U configured to receive a vehicle occupant. The easy-entry system 20 includes a sector 22 which is pivotally coupled to the second portion 18b of side member 18. The sector 22 includes an engagement slot 24 for engaging a crank 26 when the easy-entry system 20 is activated. The crank 26 includes a pin 28 at a lower end thereof which engages the engagement slot 24 of the sector 22 when the easy-entry system 20 is activated. The crank 26 is pivotally coupled to a travel bracket 30 which is configured to move along a rounded upper portion 18c of side member 18 during an easy-entry function. The travel bracket 30 is coupled to the crank 26 at pivot point P2 and is further coupled to the second portion 18b of side member 18 via a spring 32. In operation, the spring 32 is used to bias the travel bracket 30 back to the in use position shown in FIG. 1. The easy-entry system 20 further includes an engagement lever 34 having a connection arm 36 which is coupled to a cable 52. The engagement lever 34 is pivotally coupled to side member 18 at location 37 and includes a biasing spring 38 to bias the engagement lever 34 towards the at-rest position shown in FIG. 1. The engagement lever 34 is used to activate the easy-entry system 20 by engaging the crank 26 with the sector 22. The activation of the easy-entry system 20 is executed by a user engaging an external lever 58 which is generally positioned on an external side of the seat assembly 10 and is accessible when the vehicle door is open. The external lever 58 is connected to cable 52 and is moveable along a path indicated by arrow $F_1$ between an at-rest position 60, shown in FIG. 1, to an activated release position 62, shown in FIG. 3. Moving the external lever 58 upward along path $F_1$ to the release position 62, pulls the cable 52 in a direction as indicated by arrow $F_2$. This action pivots the engagement lever 34 in a direction as indicated by arrow $F_3$. The pivoting action of the engagement lever 34 moves the crank 26 along a path indicated by arrow $F_4$ into engagement with the sector 22. Specifically, pin 28 of the crank 26 is caused to be engaged with engagement slot 24 of sector 22 by the movement of the connection arm 36. As further shown in FIG. 1, the cable 52 is coupled to side member 18 at cable mount 54. A cable housing 56 protects the cable 52 within the seat assembly 10 towards the connection of the cable 52 to the external lever 58. Activation of the easy-entry system 20 is further described below with reference to FIG. 3.

The easy-entry system 20 further includes a track release lever 40 which is pivotally coupled to side member 18. The track release lever 40 includes an upright arm 42 that is coupled to a disengagement rod 44. The disengagement rod 44 is contemplated to be a rigid member which is further coupled to a spring member 46 mounted on a body portion 22a of the sector 22. The spring member 46 includes a first leg 46a which is coupled to a first end 44a of the disengagement rod 44. A second end 44b of the disengagement rod 44 is coupled to the upright arm 42 of the track release lever 40. In use, the disengagement rod 44 travels in forward and rearward directions as indicated by arrow E. This movement which then pivots the upright arm 42 in a direction as indicated by arrow D, such that the track release lever 40 also pivots along a path as indicated by arrow C. The track release lever 40 is further coupled to a track latch piston 50 which is shown in FIG. 1 in a latched position. While in the upright latched position, the track latch piston 50 locks the seat assembly 10 in its current position on the seat track 11. As further described below, the track latch piston 50 can be vertically depressed to an unlatched position to allow the seat assembly 10 to move freely along the seat track 11 in forward and rearward directions as indicated by arrow A.

Figure 2:
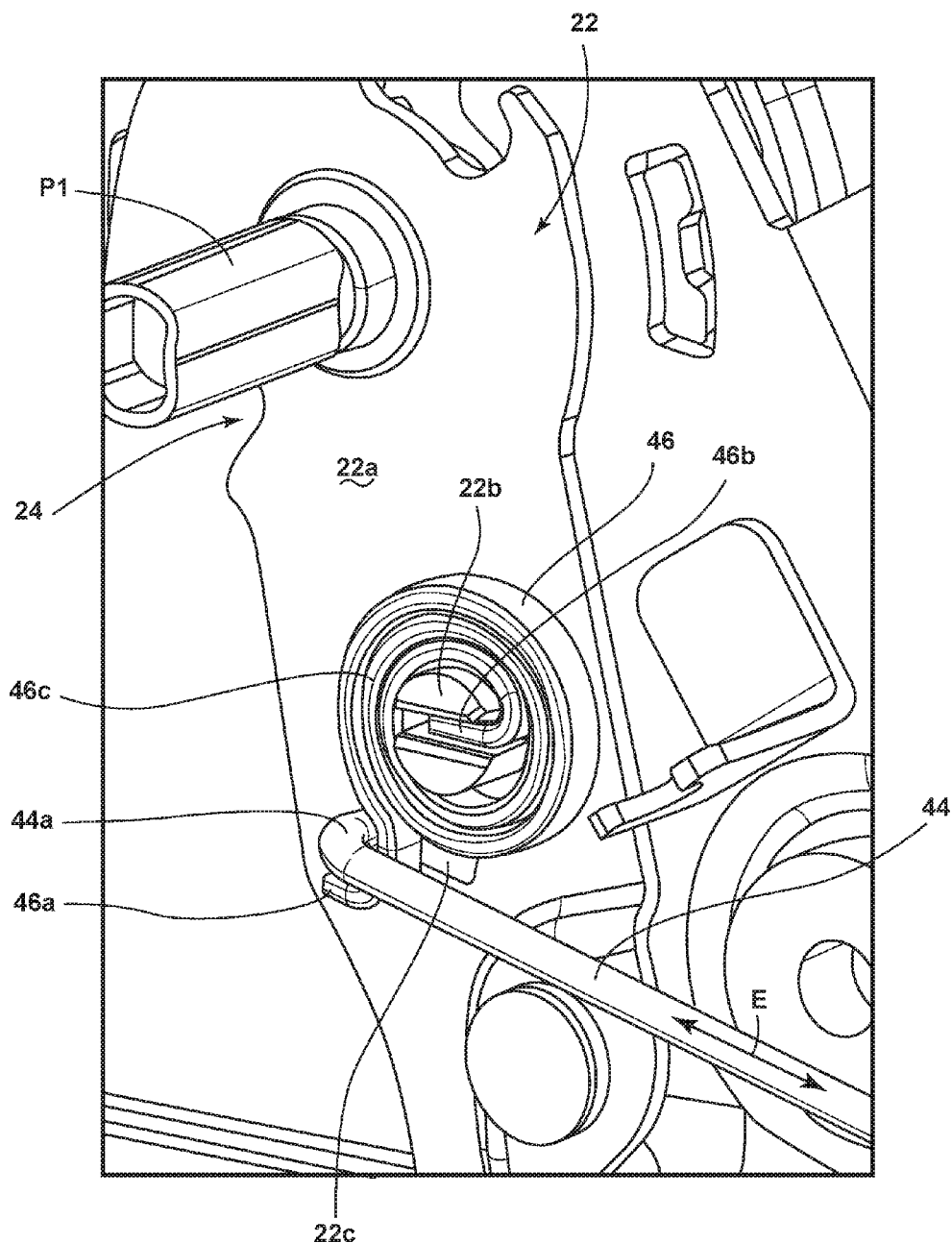
FIG. 2 is a side perspective view of a disengagement rod and spring connection of the over-travel mechanism of FIG. 1.

Referring now to FIG. 2, the disengagement rod 44 is shown as coupled to spring member 46. Specifically, the disengagement rod 44 includes a first end 44a which is coupled to first leg 46a of the spring member 46 in a hook like manner. The spring member 46 further includes a second leg 46b which is coupled to a mounting bracket 22b disposed on the body portion 22a of the sector 22. In the embodiment shown in FIG. 2, the spring member 46 is a clock spring having a wound coil body portion 46c. The first end 44a of disengagement rod 44 is shown disposed at a slot 22c which is positioned through the body portion 22a of the sector 22. The movement of the sector 22 during an easy-entry function is further described below. This movement of the sector 22 correlates to the movement of the disengagement rod 44 along the path indicated by arrow E as well as an interaction between the disengagement rod 44 and the sector 22 via spring member 46.

Figure 3:
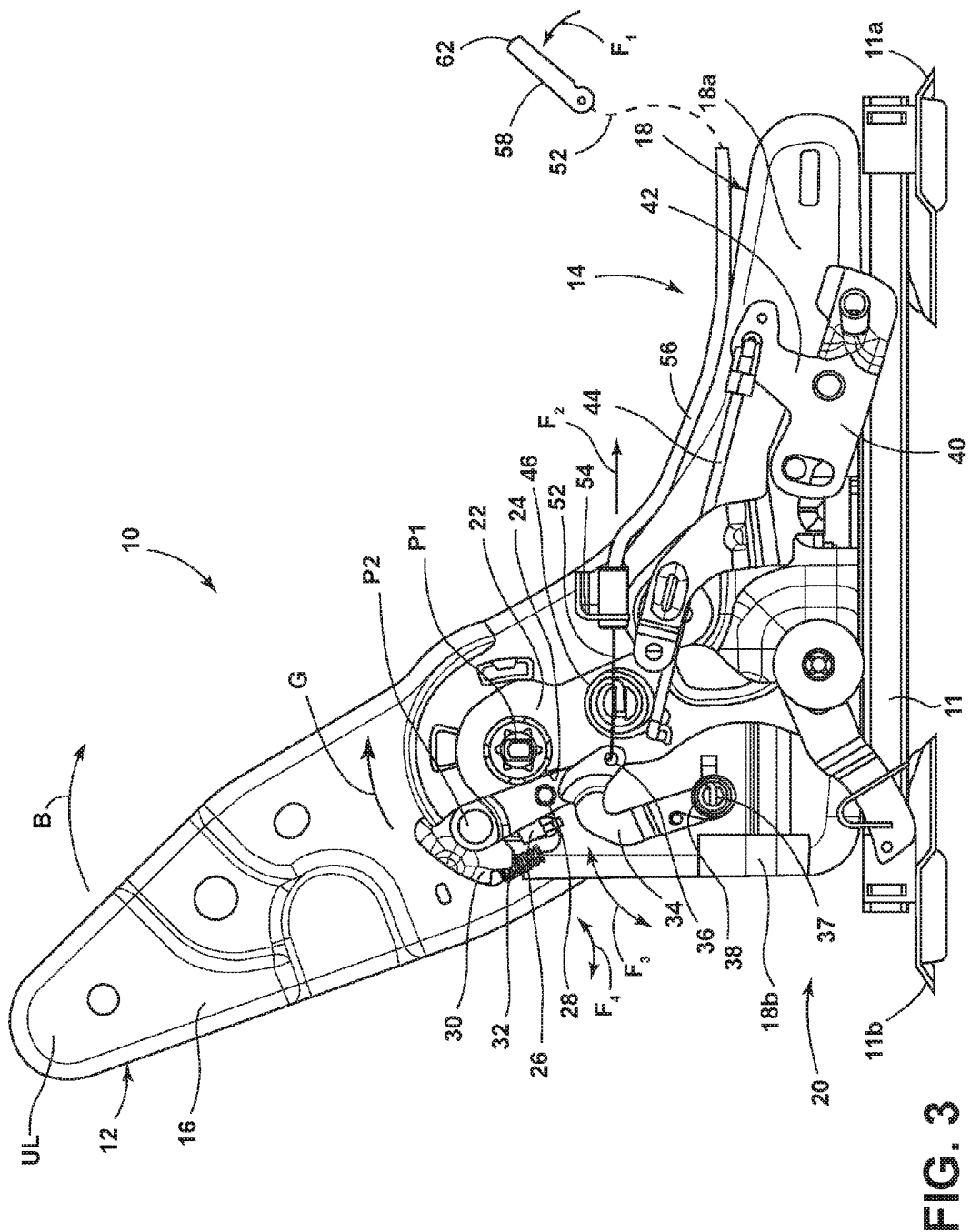
FIG. 3 is a side elevational view of the seat assembly of FIG. 1 with the easy-entry system activated.

Referring now to FIG. 3, the easy-entry system 20 is shown in an engaged or activated position. Thus, engagement lever 34 has pivoted in a car-forward direction as indicated by arrow $F_3$ towards the sector 22. The movement of the engagement lever 34 is caused by the generally upward movement of external lever 58 along path $F_1$ to the release position 62 which pulls the cable 52 along path $F_2$. The crank 26 has moved along the path $F_4$ such that the pin 28 is now engaged with engagement slot 24 of the sector 22 due to movement of the connection arm 36. The travel bracket 30 is configured to move along the upper portion 18c of side member 18 in a direction as indicated by arrow G. Further, the seatback 12 is now in the unlocked position UL, which is an activated position due to the movement of the external lever 58 to the release position 62 and is thus ready for a forward incline movement along the path indicated by arrow B relative to seat member 14.

Figure 4:
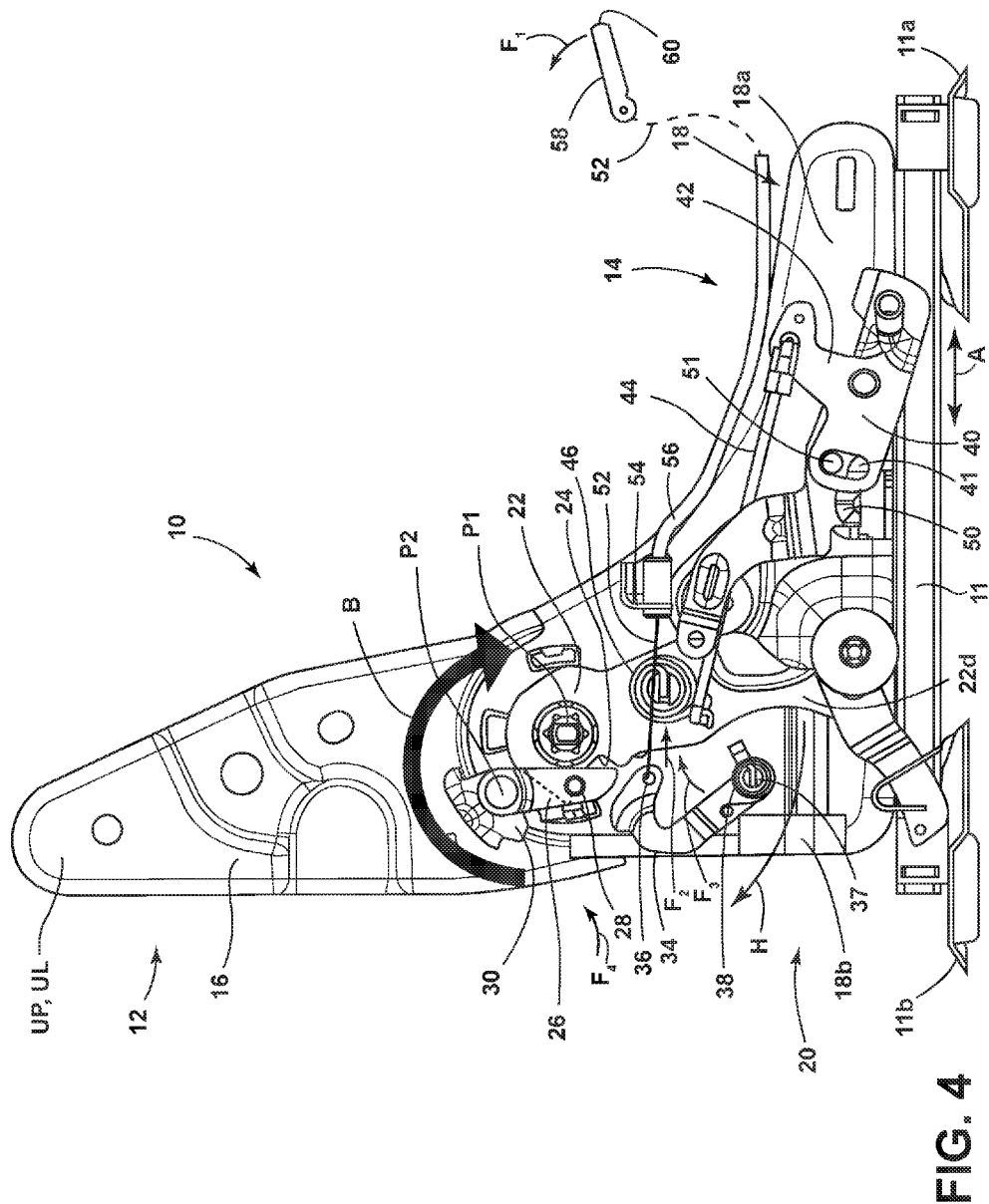
FIG. 4 is a side elevational view of the seat assembly of FIG. 3 with the seatback being pivoted towards a forward leaning position and further showing a latch mechanism in a latched position.

Referring now to FIGS. 4 and 5, the seatback 12 has been rotated forward to the fully upright position UP, shown in FIG. 4, to a release position R shown in FIG. 5, along the path indicated by arrow B. The pin 28 of the crank 26 is engaged with the engagement slot 24 of the sector 22. As shown in FIG. 5, the sector 22 rotates forward along a path as indicated by arrow H as driven by the rotation of the seatback 12, such that a lower portion 22d of the sector 22 moves in a car-rearward direction from FIG. 4 to FIG. 5. This movement causes the disengagement rod 44 to move in the car-rearward direction as indicated by arrow E. This car-rearward movement of the disengagement rod 44 provides for the rotational movement of the track release lever 40 which is coupled to pin 51 at slot 41 which is further coupled to the track latch piston 50. As the track release lever 40 rotates in a rearward direction along the path indicated by arrow C shown in FIG. 5, the pin 51 is pushed downward within slot 41 such that the track latch piston 50 is depressed in a vertical direction as indicated by arrow I. In the depressed position, the track latch piston 50 has unlatched the seat assembly 10 from the seat track 11, such that the seat assembly 10 is now ready for movement along the seat track 11 as indicated by arrow A. As shown in FIG. 5, the track release lever 40 has been rotated to a fully rotated unlocked position.

Referring now to FIG. 6, the seatback 12 is shown in an over-travel position OT. As used herein, the term "over-travel position" means that the seatback 12 has moved to a position beyond that which is required to release or unlock the seat assembly 10 from the seat track 11. As shown in FIG. 6, the over-travel position OT may be a forward leaning position of the seatback 12 relative to the seat member 14. This movement is often caused by a user trying to pull the seatback 12 in a car-forward direction to activate the easy-entry system 20. However, moving the seatback 12 to the over-travel position OT can cause problems with the rotation of the track release lever 40 via the disengagement rod 44. This is because, as mentioned above, the normal seat assembly requires a finite amount of movement in order to fully release the seat assembly from a seat track. This is most likely due to a static or fixed connection between a disengagement rod and a sector, which if over exerted upon, can fail in an easy-entry function. However, with the present invention, the easy-entry system 20 includes a kinetic or flexible connection between the disengagement rod 44 and the sector 22 at spring member 46 within slot 22c of the sector 22 as best shown in FIG. 2. The flexible connection of the disengagement rod 44 to the sector 22 in the present invention provides for a kinetic or forgiving coupling which allows for movement of the seatback 12 to the over-travel position OT without damaging the easy-entry system 20. Rather, as the seatback 12 moves to the over-travel position OT, the spring member 46 absorbs an amount of the force realized on the disengagement rod 44 as the sector continues to rotate along the path as indicated by arrow H. In this way, the flexible connection of the disengagement rod 44 and sector 22 allows for some play as the seatback 12 moves to the over-travel position OT. As noted above with reference to FIG. 5, the track release lever 40 is already in the fully rotated unlocked position when the seatback 12 is in the release position R. As the seatback 12 rotates from the release position R of FIG. 5 to the over-travel position OT of FIG. 6, the track release lever 40 does not rotate, even though the sector 22 continues to rotate with the seatback 12. Thus, the movement of the seatback 12 from the release position R of FIG. 5 to the over-travel position OT of FIG. 6 does not affect the position of the track release lever 40, thereby minimizing any damage to the seat track 11, track latch piston 50 and track release lever 40 that could be caused by trying to over-rotate the track release lever 40. The movement of the easy-entry system 20 is further described below with specific reference to FIGS. 7A-7B.

Figure 7A:
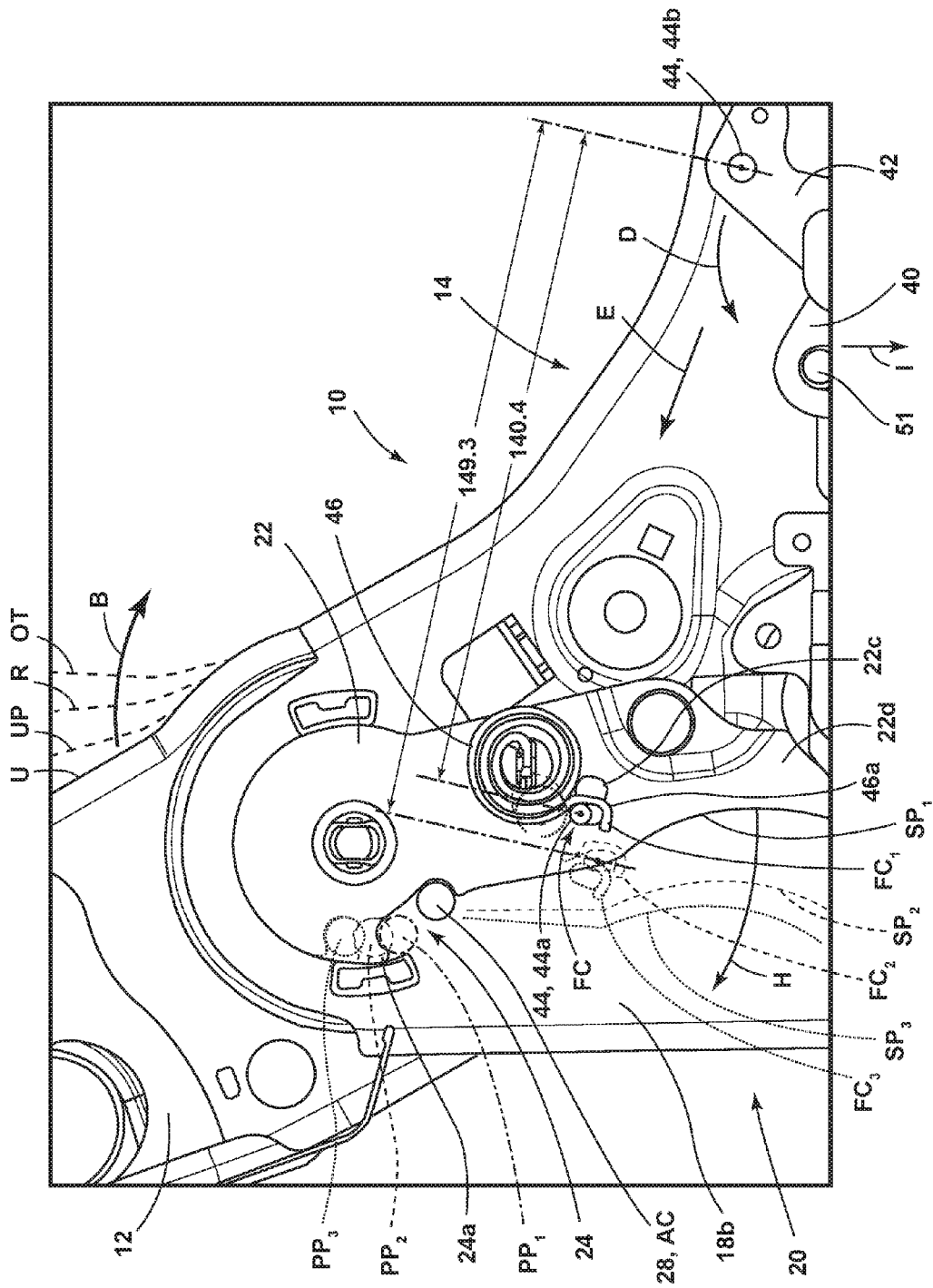
FIG. 7A is a side elevational view of the over-travel mechanism showing relative displacement of the sector plate.
Figure 7B:
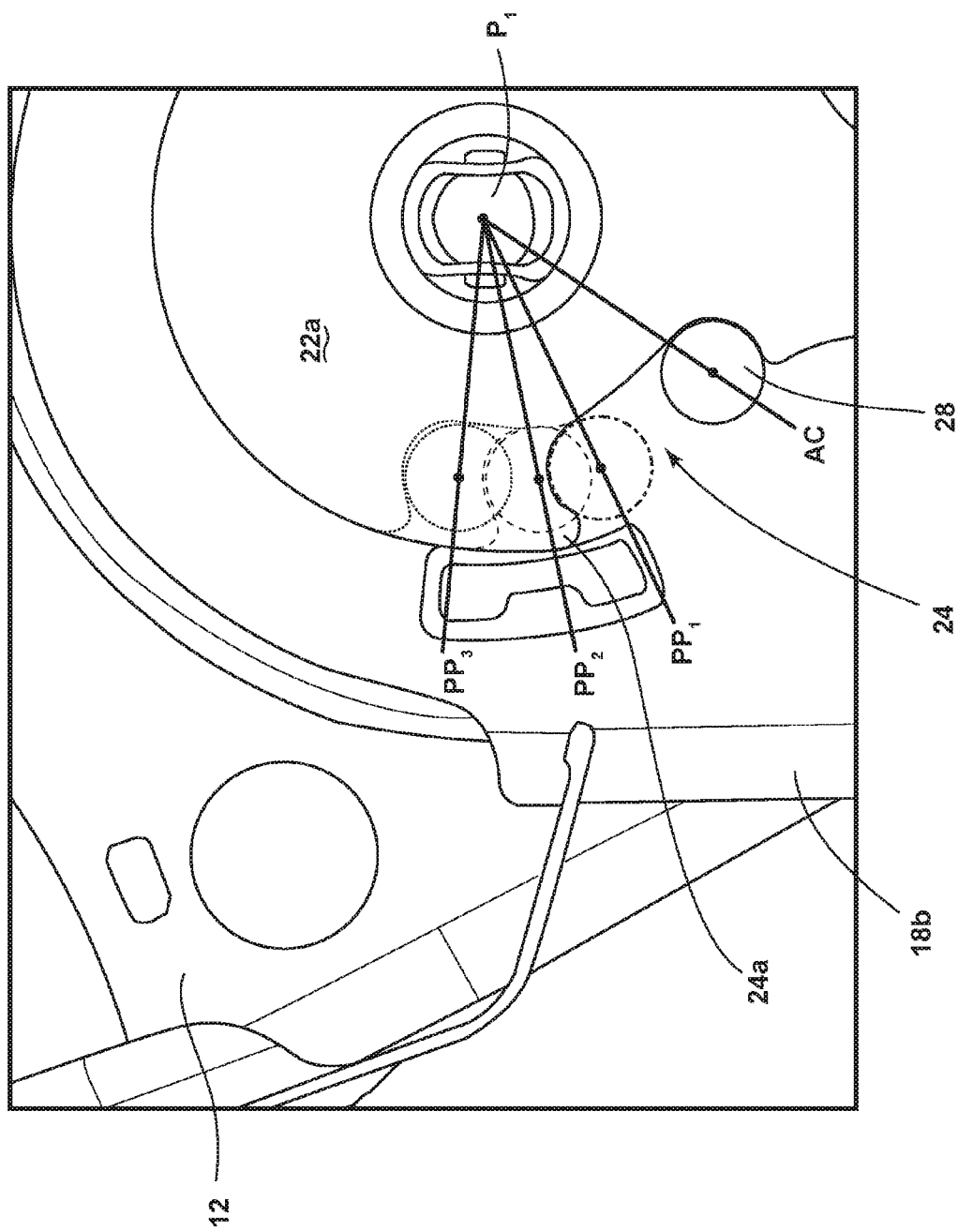
FIG. 7B is a side elevational view of the seat assembly of FIG. 7A showing relative movement of the seatback between free, engaged and over-travel positions.

Referring now to FIGS. 7A-7B, the sector 22 is depicted showing relative movement of the sector 22 along path H in to sector positions SP1-SP3. Pin 28, shown in FIG. 1 as coupled to the crank 26, is also shown in an activated or engaged pin position AC with slot 24 of sector 22, and relative movement of the pin 28 is shown as pin positions PP1-PP3 as the sector 22 moves along path H to sector positions SP1-SP3. Finally, the flexibly resilient coupling FC of the sector 22 and disengagement rod 44 at spring member 46 is shown, with relative movement of the flexible coupling FC shown in positions FC1-FC3 as the sector 22 moves along path H to sector positions SP1-SP3. When the easy-entry system 20 is activated, as described above with reference to FIG. 3, the pin 28 moves into engagement with slot 24 of the sector 22 at activated position AC. As the seatback 12 moves forward along path B from the use position U to the upright position UP, the pin 28 moves to a notch 24a disposed in an upper end of engagement slot 24 in pin position PP1. This movement is due to the coupling of the seatback 12 and crank 26 described above. As the seatback 12 further moves along path B from the upright position UP to the release position R, the sector 22 rotates from sector position SP1 to sector position SP2 due to the sector's engagement with pin 28 as coupled to the crank 26 which moves with seatback 12 (shown and described above with reference to FIG. 3) from pin position PP1 to pin position PP2. With reference to the lower portion 22d of sector 22, movement along path H from sector position SP1 to sector position SP2 causes movement of the flexible coupling FC of end 44a of disengagement rod 44 and spring member 46 to move from position FC1 to FC2. This movement then pivots the upright arm 42 of track release lever 40 in a direction as indicated by arrow D, such that the pin 51 moves downward along path I to move the track latch piston 50 to the depressed release position, as described above with reference to FIG. 5. As shown in FIG. 7A, the displacement of the flexible coupling FC from position FC1 to FC2 may be about 9 mm. This is enough displacement of the disengagement rod 44 to rotate the track release lever 40 to free the seat assembly 10 from the seat track 11 (shown in FIG. 1).

As the seatback 12 further moves along path B from the release position R to the over-travel position OT, the sector 22 rotates from sector position SP2 to sector position SP3 due to the sector's engagement with pin 28. Pin 28, moving with the seatback 12, moves from pin position PP2 to pin position PP3. With reference to the lower portion 22d of sector 22, movement along path H from sector position SP2 to sector position SP3 causes movement of the flexible coupling FC of end 44a of disengagement rod 44 and spring member 46 to move from position FC2 to FC3. As noted above, in sector position SP2, the seat assembly 10 is released from the seat track 11 and free to move forward along path A (see FIG. 5). Moving the seatback 12 to the over-travel position OT from the release position R will cause the spring member 46 to wind up or load as the track release lever 40 will have already reached its fully rotated unlocked position. In this way, the easy-entry system 20 allows the seatback 12 to move to the over-travel position OT from the release position R without damaging the connection of the disengagement rod 44 to the track release lever 40. Without the flexible coupling FC of the disengagement rod 44 to the sector 22 at spring member 46, the track release lever 40 could be damaged and cause the seat assembly 10 to partially or fully engage the seat track 11, thereby prohibiting movement of the seat assembly 10 along the seat track 11. It is contemplated the spring member 46 may have a minimum spring force or torque of about 2471 Nmm, or rather, a minimum torque necessary to overcome the track release force. It is further contemplated that a spring member could be disposed on the track release lever 40 at end 44b of the disengagement rod 44 to absorb rotation of the sector 22 when moving the seatback 12 to the over-travel position OT.

In the exemplary embodiment of FIG. 7B, relative movement of the pin 28 from the activated position AC to pin position PP1 is shown as being about a 16° rotation. As noted above, this movement of the pin 28 from the activated position AC to pin position PP1 is executed by a user moving seatback 12 16° from the use position U to the upright position UP shown in FIG. 7A. As further shown in FIG. 7B, relative movement of the pin 28 from pin position PP1 to pin position PP2 is shown as being about an 11° rotation. Also noted above, this movement of the pin 28 from pin position PP1 to pin position PP2 is executed by a user moving seatback 12 from the upright position UP to the release position R shown in FIG. 7A. This movement unlocks the seat assembly 10 from the seat track 11. Finally, movement of the seatback 12 from the release position R to the over-travel position OT causes the pin 28 to move from pin position PP2 to pin position PP3 which is contemplated to be about a 4° rotation. One of ordinary skill in the art will appreciate that the degree of rotation may vary with different seat assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

I claim:

1. A seat assembly, comprising:
a seatback pivotally coupled to a seat member between use, release and over-travel positions;
a sector and a track release lever pivotally coupled to the seat member for rotation with the seatback; and
a disengagement rod coupled to a spring member mounted on a body portion of the sector and further coupled to the track release lever, wherein rotation of the seatback to the release and over-travel positions causes the track release lever to unlock the seat assembly from a seat track.

2. The seat assembly of claim 1, wherein the rotation of the seatback to the release position rotates the track release lever to a fully rotated unlocked position.

3. The seat assembly of claim 2, wherein the spring member is a clock spring.

4. The seat assembly of claim 3, wherein rotation of the seatback from the release position to the over-travel position loads the clock spring.

5. The seat assembly of claim 1, wherein the track release lever is coupled to a track latch piston that is moveable between locked and unlocked positions relative to the seat track.

6. The seat assembly of claim 5, including:
a crank operably coupled to the seatback for rotation therewith, the crank including a pin;
an engagement lever operably coupled to the seat member and configured to move the crank into an engaged position as activated by an external lever, wherein the pin engages an engagement slot disposed on the sector when the crank is in the engaged position.

7. A seat assembly, comprising:
a seatback pivotally coupled to a seat member;
a sector and a track release lever pivotally coupled to the seat member for rotation with the seatback;
a biasing member mounted on the sector; and
a disengagement rod having first and second ends, wherein the first end is coupled to the biasing member and further wherein the second end is coupled to the track release lever; wherein rotation of the seatback to one of a release position and over-travel position causes the track release lever to unlock the seat assembly from a seat track.

8. The seat assembly of claim 7, wherein rearward rotation of the seatback causes the track release lever to unlock the seat assembly from a seat track for lateral movement thereon.

9. The seat assembly of claim 8, wherein the seatback is operable between use, release and over-travel positions relative to the seat member.

10. The seat assembly of claim 9, wherein the biasing member is a flexibly resilient spring member.

11. The seat assembly of claim 10, wherein rotation of the seatback from one of the release position and the use position to the over-travel position loads the spring member.

12. The seat assembly of claim 9, wherein the seat member is locked in place on the seat track when the seatback is in the use position.

13. The seat assembly of claim 7, wherein the biasing member includes first and second ends, the first end of the biasing member coupled to the first end of the disengagement rod and the second end of the biasing member coupled to the sector.

14. The seat assembly of claim 13, wherein the sector includes a body portion having a mounting bracket, and further wherein the second end of the biasing member is coupled to the mounting bracket of the sector.

15. A seat assembly, comprising:
a seat frame including a pivoting seatback and a seat member;
a disengagement rod and spring member coupled between a sector and a track release lever, wherein pivoting the seatback to a release position rotates the sector and the track release lever to unlock the seat assembly from a seat track; and
wherein the seatback is moveable to an over-travel position wherein the spring member loads as the sector rotates.

16. The seat assembly of claim 15, wherein pivoting the seatback to the release position rotates the track release lever to a fully rotated unlocked position.

17. The seat assembly of claim 16, wherein the track release lever is fixed in the fully rotated unlocked position as the seatback travels to the over-travel position.

18. The seat assembly of claim 17, wherein the track release lever is coupled to a track latch piston that is moveable between locked and unlocked positions relative to the seat track.

19. The seat assembly of claim 18, wherein the spring member is a clock spring.

\* \* \* \* \*